UNITED STATES PATENT OFFICE.

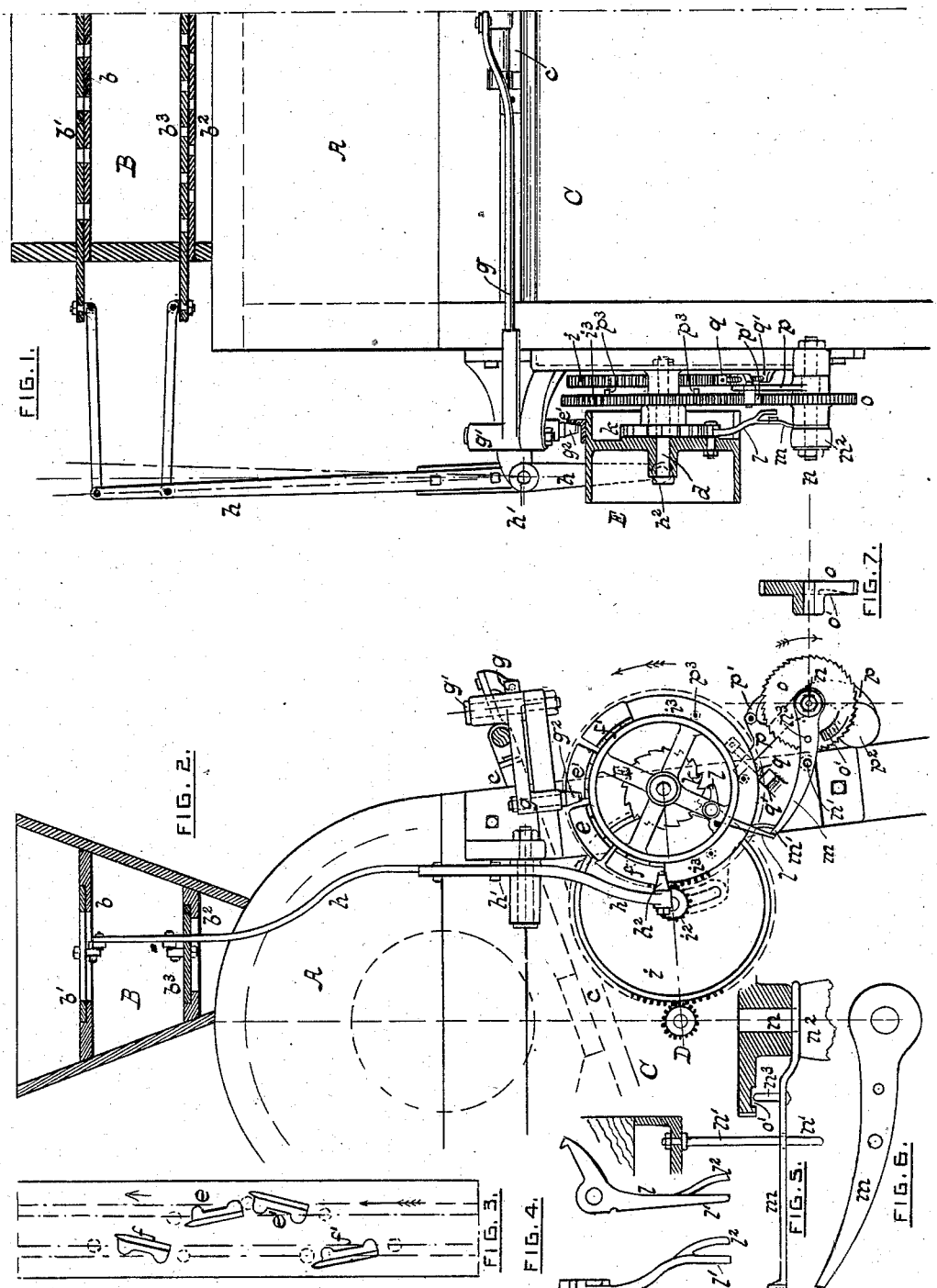

JAMES GOODYEAR, OF YONKERS, NEW YORK, ASSIGNOR OF ONE-HALF TO RUDOLF EICKEMEYER, OF SAME PLACE.

AUTOMATIC FEEDING AND DISCHARGING MECHANISM FOR HOMINY-MILLS, &c.

SPECIFICATION forming part of Letters Patent No. 258,200, dated May 16, 1882.

Application filed December 19, 1881. (No model.)

*To all whom it may concern:*

Be it known that I, JAMES GOODYEAR, of Yonkers, in the county of Westchester and State of New York, have invented certain new and useful Improvements in Automatic Feeding and Discharging Mechanism for Hominy-Mills, &c.; and I do hereby declare that the following specification, taken in connection with the drawings furnished and forming a part of the same, is a clear, true, and complete description of my invention.

Although I hereinafter describe my said improvements as organized for use in connection with hominy-mills, they are equally applicable to mills of any kind to which the material to be operated upon therein is fed thereto and discharged therefrom at intervals, as distinguished from the continuous feed and discharge, as with ordinary grinding-mills.

After a detailed description of mechanism embodying my invention, the features deemed novel will be specified in the several claims hereunto annexed.

Referring to the drawings, Figure 1 is a front view of so much of a hominy-mill as is deemed necessary, with my improvements attached, partially shown in vertical section. Fig. 2 is a side view of the same. Fig. 3 is a surface projection of a disk carrying cams or inclines for operating the feeding and discharging gates. Figs. 4, 5, 6, and 7 are views of detailed parts to be specifically hereinafter referred to.

The hominy-mill has a knife or beater chamber, A, a hopper, B, and a worm-chamber, C, substantially as heretofore in certain classes of mills.

The hopper B is divided into upper and lower portions by a horizontal plate, $b$, provided with openings, and these are guarded by a valve or gate plate, $b'$, having corresponding openings, which will register with those in the plate for discharging grain from the upper portion (into which it is poured in mass or fed through a spout) into the lower portion. The period of time being varied during which the gate is opened will vary the quantity thus received into the lower portion of the hopper. The bottom of the hopper $b^2$ is also provided with openings, which are guarded by a valve-plate, $b^3$, as before described, so that when grain is entering from above the openings in the bottom $b^2$ may be closed, and when the entering supply is cut off said valve-plate is moved to deliver the predetermined charge of grain from the hopper into the beater or knife chamber A, after which said plate is moved again to close the bottom of the hopper for receiving another charge, the upper valve-plate being meantime moved for that purpose, and so on successively at suitable intervals. Instead of this upper valve-plate, a pivoted spout leading from a grain-bin may be employed in connection with a closely-adjacent stationary base-plate, from over which the mouth of said spout may be moved at intervals. With the pivoted spout thus suggested the flow of grain therefrom would be permitted and cut off by the swinging movement of the lower end of said spout from its closed position, which would be directly over the base-plate, to a position at one side thereof and back again, the lower end of said spout being connected with the vertical lever precisely as is the upper valve-plate shown. The grain, having been duly acted upon in the beater-chamber, is discharged therefrom into the hominy or "worm" chamber C through similar openings controlled by a similar valve-plate, $c$, the outer end of which is shown in Figs. 1 and 2 and further indicated in dotted lines in the latter figure.

The apertures in the plate $b$ should obviously be closed when the apertures in the bottom $b^2$ of the hopper are opened, and these latter should always be closed when the apertures guarded by valve $c$ are opened.

It is also obvious that the operation within the knife or beater chamber, or that portion of any apparatus in which the work desired is performed, should govern or control the matter of receiving and discharging, and that said operation must vary in respect of time according to varying conditions—as, for instance, more time would be requisite for making fine than coarse hominy, and variations would also be involved in working corn of different varieties, or in varied conditions as to age or dryness, and therefore in the development of automatic apparatus it is important that it should have a wide range of adjustment for operation at varied intervals of time, regardless of the uniformity of motion on the part of the main or working parts of the mill, and I have devised my automatic mechanism with due reference to all the varied conditions incident to its use, and also with due reference to simplicity, economy in construction, and reliability in operation.

For operating my feeding and discharging mechanism I can rely upon power from any adjacent source outside of the machine, but prefer to employ the worm-shaft D, commonly used in such mills, for constantly conveying the disintegrated grain from below the knife-chamber and cooling it in its passage therefrom.

My apparatus embodies mechanism which continuously revolves, mechanism which intermittingly revolves in complete revolutions, and mechanism which is continuously revolved intermittingly step by step. I will first describe that portion thereof to which the several valve-gates are operatively connected.

A pulley or broad-faced wheel, E, is rotatively but loosely mounted on a stud, $d$, projecting from the frame of the machine at one end thereof. This wheel E has on its periphery a series of raised cam-surfaces, $e$ $e'$, and $f$ $f'$. (Clearly shown in Fig. 3.) The valve-gate $c$ is coupled to a horizontal bell-crank lever, $g$, pivoted at $g'$, and having at its outer end, on a pendent arm, a friction-roller, $g^2$, which overlies the wheel E and stands in the path of the cams $e$ and $e'$, so that as said wheel revolves first one cam and then the other will engage with said lever and move its outer or opposite end to and fro, thus opening and closing the gate $c$ for discharging from the knife-chamber and making ready for the reception of a succeeding charge.

The valve-gates $b'$ and $b^3$, as will be seen, are so arranged that when either is opened the other is closed. I therefore connect both gates to the upper end of a vertical bent lever, $h$, pivoted at $h'$, and provided at its lower end with a stud parallel with the pivot, and having a friction-roller, $h^2$, which stands near the periphery of the cam-wheel E in the horizontal plane of its axis, but at right angles thereto, and in the path of the cams $f$ and $f'$, so that these latter, as the wheel revolves, vibrate the lever $h$, and thus open and close the gates $b'$ and $b^3$.

The rotation of the cam-wheel E is effected from the worm-shaft D, acting through a small pinion thereon meshing with a large gear, $i$, having a small pinion, $i^2$, attached to its outer side, which meshes with a larger gear, $i^3$, on the stud $d$. The gear $i^3$ has a hub, to which the toothed wheel $k$ is connected within the cam-wheel E. Although the toothed wheel $k$ resembles a ratchet-wheel and co-operates with a pawl, as hereinafter described, it is to be understood that the teeth on said wheel and the pawl operate merely as a clutch for rotatively connecting the cam-wheel with the continuously-rotating toothed wheel. These gears and the toothed wheel are in constant motion while the mill is in operation; but the cam-wheel is only rotated whenever it is rotatively connected with the toothed wheel $k$ by means of a spring-pawl, $l$, which is pivoted to the inner face of the web of the cam-wheel, and has its outer forked end projected through a slot or opening in the periphery of said cam-wheel. The pawl $l$ is so actuated by its spring (not shown) as to cause its inner or hooked end to engage with the teeth of the continuously-rotating wheel $k$ when permitted so to do, and while thus engaged the cam-wheel is rotated by and with said wheel. So long as the spring-pawl $l$ is kept from engagement with the toothed wheel $k$ the cam-wheel is stationary, and the disengagement of said pawl from the toothed wheel $k$ is effected by means of an automatic stop, $m$, the end $m'$ of which is normally in abutting engagement with one or the other of the two fingers $l'$ $l^2$ at the outer end of the spring-pawl. This stop $m$ is rendered automatic as follows: It is a curved arm loosely mounted at one end upon the stud $n$, and projects rearward horizontally, and is maintained in that position by a rod, $n'$, projecting at right angles horizontally from the end of the mill and passing loosely through a hole in the stop-arm, as clearly seen in Fig. 5. Upon the stud $n$, outside of the stop-arm, is a rubber spring, $n^2$, and a clamping-nut, whereby the outer end, $m'$, of the stop-arm is normally under pressure, by which it will be forced inward or toward the mill, and when in that position it is out of the path of one portion of the pawl $l$ when the cam-wheel rotates therewith. Said stop-arm is, however, maintained in its operative or abutting position in the path of said pawl by the outer face of a ratchet-wheel, $o$, mounted on stud $n$, alongside of the stop-arm, which has a rigid lateral pin, $n^3$, in sliding abutting contact with the outer face of ratchet-wheel $o$, thereby preventing the end $m'$ of stop-arm $m$ from being moved inward by its spring, except when permitted so to do by an inclined recess, $o'$, in the outer side of ratchet-wheel $o$, which serves as a cam co-operating with the spring for thus laterally vibrating the outer end of the stop-arm once during each revolution of said ratchet-wheel $o$.

The path of the outer end of spring-pawl $l$ has been referred to; but particular attention must be given to the peculiar construction of the coincident ends of said pawl and stop $m$ at $m'$ and their peculiar arrangement and operation.

As seen in Figs. 1, 2, and 4, the pawl $l$ at its outer end has a first and a second finger, $l'$ and $l^2$. The latter is not only forward of the finger $l'$, but also to the one side thereof, thus affording a free space between them in two directions, as clearly seen in the two views of said pawl afforded in Fig. 4. The outer end, $m'$, of stop $m$ has a laterally-projecting abutting face more than twice as wide as the thickness of the stop, as is clearly seen in Figs. 1 and 5. It will now be clearly understood that the first finger, $l'$, travels in one circular path and the second finger, $l^2$, in another parallel therewith, and that the space between them in the vertical plane of the stop-arm is ample to accommodate the latter when it is made to release the pawl from the toothed wheel $k$ by the inward movement of said arm, due to the action of its spring, as before described, and that the other space between said fingers, as seen in Fig. 2, is ample to allow the lateral projection at $m'$ of stop $m$ to freely pass whenever the stop, by moving inward, is released from its abutting contact with the finger $l'$. The two pawl-fingers then straddling the stop-arm are free to permit the cam-wheel to revolve and carry its pawl therewith; but the end $m'$ of the stop-arm does not move so far inward that when stationary it will be placed out of the path of the second finger, $l^2$, which therefore, when it comes around, strikes against said stop-arm, and thus surely stops the cam-wheel after one revolution, and then after the slow rotation of the ratchet-wheel $o$ has again moved the stop-arm outward it freely slips off from the second finger, $l^2$, and abuts against the first finger, $l'$, until next again operated by the ratchet-wheel $o$ for releasing the same.

I have now only to describe the method of imparting the step-by-step movement to the ratchet-wheel $o$ and the means by which its rotation is variably graduated for operating the valve-gates at such variable intervals as may from time to time be desirable.

A curved and weighted pawl-lever, $p$, is loosely mounted on the stud $n$ alongside the ratchet-wheel $o$, and is provided with one or more pawls, $p'$. It is desirable that several pawls be used side by side, of slightly-varying lengths, so as to enable a fine adjustment. The weight $p^2$ of the pawl-lever causes the upper end thereof to normally incline toward the cam-wheel, and said upper end has on one side a lug or ear, through which an adjusting-screw, $q$, is tapped. The adjusting-screw, at its lower end, is seated upon the upper face of a lug or ear, $q'$, projecting from the frame of the machine, as seen in Figs. 1 and 2. The upper end of the pawl-lever $p$ extends alongside of the inner face of the large driving-gear $i^3$, before described, which is constantly rotating, and is provided with one or more laterally-projecting removable studs or pins, $p^3$, which, by engaging against the under side of the pawl-lever, lift its outer end, and by means of the pawl cause the ratchet $o$ to rotate to a degree corresponding to the degree of vibration of the pawl-lever. By advancing or retiring the adjusting-screw $q$ the pawl-lever is vibrated less or more, and by increasing or decreasing the number of removable studs or pins $p^3$ the number of vibrations of the pawl-lever in a given time will be increased or decreased, thus affording a wide range of adjustability with reference to the intervals between the rotations of the cam-wheel and the consequent movements of the valve-plates.

As an equivalent of the adjusting-screw, the stop pin or pins $p^3$ may be radially adjustable on the gear $i^3$, so that the nearer said pins be located with reference to the periphery of the gear the greater would be the vibrative movement of the pawl-lever and the greater the rotative movement of the ratchet-wheel.

The rotation of the worm-shaft D is usually quite slow, and the reductions in speed provided for in the gearing, substantially as shown, produce a very slow rotation of gear $i^3$, which, having one pin, $p^3$, and co-operating with the pawl-lever set by its screw so as to engage with but one tooth at a time, would afford the longest interval ever required between the rotations of the cam-wheel, and the shortest intervals would follow the use of the full number of pins $p^3$ (six, or even more, if desired) co-operating with the pawl-lever set by its screw, so as to make its greatest movement, covering the maximum number of teeth of the ratchet-wheel $o$, thus affording a wide range of adjustability as to the intervals of time in working the valve-plates.

It will be seen that the toothed wheel $k$ is continuously rotating, and that the cam-wheel is intermittingly caused to make one complete revolution and then rest, and that the ratchet-wheel $o$ is continuously rotated intermittingly step by step, and also that, while the cam-wheel is limited to one complete rotation to each complete rotation of the ratchet-wheel $o$, the cam-wheel makes its complete rotation in quicker time than the ratchet-wheel $o$, because while the latter is rotating to an extent of not more than, say, one or two teeth, the cam-wheel is completely revolved, thus causing a prompt and effective operation of the several gates.

I do not claim to have been the first to devise automatic feeding and discharging mechanism for mills of the general character indicated, for I am well aware that in such mills springs and weights have heretofore been employed for closing valves or gates, and that for the opening of said gates continuously-rotating cam-wheels have been employed; and that also, in connection with weights or springs, a ratchet-wheel moved step by step and provided with cams has been heretofore employed for opening such gates. Said prior mechanism obviously involves considerable waste of time in charging and discharging a mill, because of the necessarily slow movement of said prior cam-wheels, and this I overcome by the use for the first time of a cam-wheel which is not continuously revolved, nor revolved step by step, as heretofore, but which, while it is making one complete revolution, promptly opens and closes the gates, and then rests during the full time requisite for the proper operation of the mill upon the charge therein contained; and I do not therefore limit myself to the precise construction and arrangement of mechanism shown and described, except as hereinafter indicated in the claims annexed.

Among the obvious variations which can be made without departure from my invention I will refer to the fact that several mills may be attended by one man if the upper valve-plate, b', be dispensed with, in which case the proper quantities of grain will be deposited in the hopper from time to time after each automatic charging of the mill; or only the valve-gate c may be automatically operated, the tender relying upon the difference in the sound of the running mill to know when a discharge has been effected and a new charge required; but I prefer the entire arrangement of valves shown, because then the upper portion of the hopper may be continuously supplied with grain from an elevated bin through a vertical rigid spout or an inclined flexible-mouthed spout, and the operation of the mill be rendered wholly automatic. Also, instead of the pawl l and toothed wheel k, a clutch of a more common type may be employed, and the pawl l arranged to force the members of the clutch apart and permit them to come together for rotating the cam-wheel, and, while I deem the arrangement shown preferable to any other known to me, I do not limit myself thereto, except as hereinafter indicated, in combination with the cam-wheel and gate-levers.

Having thus described my invention, I claim as new and desire to secure by Letters Patent—

1. The combination, substantially as hereinbefore described, of the mill-chamber, the valves or gates, the cam-wheel for opening and closing said gates, and mechanism, substantially as described, which causes a complete rotation of said cam-wheel for promptly opening and closing said valves, and permits it to rest after each rotation until the completion of operations within the chamber, as set forth.

2. The combination of one or more gate-levers, the cam-wheel, its continuously-rotating driving-gear, a pawl on said cam-wheel for connecting and disconnecting said wheel from its driving-gear, and an automatic stop for controlling and permitting the rotation of said cam-wheel at intervals, substantially as described.

3. The combination of one or more gate-levers, the cam-wheel, its two-fingered pawl, and the automatic stop, substantially as described, whereby the cam-wheel, when permitted to revolve, is limited to a single rotation, as set forth.

4. The combination, with one or more gate-levers, the cam-wheel for moving said levers and a stop for controlling the rotation of the cam-wheel at intervals, a spring for moving said stop in one direction, and a cam on a ratchet-wheel rotated step by step for moving said stop in the opposite direction, substantially as described, whereby during each slow rotation of said ratchet-wheel the cam-wheel is permitted in quicker time to make a single rotation, as set forth.

5. The combination, with one or more gate-levers, the cam-wheel, the stop, and the ratchet-wheel which automatically controls said stop, of a continuously-rotating driving-gear and a pawl-lever for said ratchet-wheel, which is adjustable as to the extent of its vibratory movement, substantially as described, whereby the time of rotation of said ratchet-wheel is varied for varying the movements of the stop, and thereby varying the intervals between the rotations of the cam-wheel and the operation of the gate-levers, as set forth.

6. The combination, with the gate-levers and the continuously-driven toothed wheel, of the cam-wheel outside of said toothed wheel, the spring-pawl mounted radially on the cam-wheel, for engaging with said toothed wheel, and an automatic stop for controlling the rotation of the cam-wheel by contact with and releasing said spring-pawl at intervals, substantially as described.

JAMES GOODYEAR.

Witnesses:
J. GEORGE NARR,
A. C. MOTT.